(12) United States Patent
Kurosawa (10) Patent No.: US 7,402,935 B2
(45) Date of Patent: Jul. 22, 2008

(54) ULTRASONIC MOTOR

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/470,744

(22) Filed: Sep. 7, 2006

(65) Prior Publication Data

US 2007/0057596 A1    Mar. 15, 2007

(30) Foreign Application Priority Data

Sep. 9, 2005    (JP) .............................. 2005-261476

(51) Int. Cl.
*H02N 2/00* (2006.01)

(52) U.S. Cl. .................... 310/323.04; 310/323.08

(58) Field of Classification Search ................................
310/323.01–323.04, 323.08, 323.13, 323.14, 310/367, 369
See application file for complete search history.

(56) References Cited

U.S. PATENT DOCUMENTS 4,739,212 A * 4/1988 Imasaka et al. ........ 310/323.11
6,664,712 B2 * 12/2003 Rayner et al. .......... 310/323.02
7,002,310 B2 * 2/2006 Cavarec et al. .............. 318/375
2005/0090366 A1 * 4/2005 Namba ......................... 477/7

FOREIGN PATENT DOCUMENTS

| JP | 63-242181 | * | 10/1988 |
| JP | 6-269181 | * | 9/1994 |
| JP | 8-191576 | * | 7/1996 |
| JP | 10-215590 | * | 8/1998 |
| JP | 2000-60154 |   | 2/2000 |

OTHER PUBLICATIONS

U.S. Appl. No. 11/532,244 to Korosawa, which was filed on Sep. 15, 2006.
U.S. Appl. No. 11/549,996 to Kurosawa, which was filed on Oct. 17, 2006.
English language Abstract of JP 2000-060154, no date provided.

* cited by examiner

*Primary Examiner*—Thomas M Dougherty
(74) *Attorney, Agent, or Firm*—Greenblum & Bernstein, P.L.C.

(57) ABSTRACT

An ultrasonic motor is provided with a circular stator including a piezoelectric element and a comb teeth body and a circular rotor supported by a rotating shaft and disposed in close contact with the comb teeth body. The stator and the rotor are magnetized in opposite polarities to each other so that the stator and the rotor are brought into close contact by an attractive magnetic force generated therebetween in an axial direction.

11 Claims, 6 Drawing Sheets

ULTRASONIC MOTOR

BACKGROUND OF THE INVENTION

The present invention relates to an ultrasonic motor, and more particularly to an ultrasonic motor having reduced dimensions in an axial direction and a radial direction, thus to be made smaller and thinner.

An ultrasonic motor includes a stator constituted of a comb teeth body circumferentially disposed in close contact with a piezoelectric element and integrally formed therewith, and a disk-shaped or ring-shaped rotor rotatably butted to the stator at a predetermined pressure, and is configured to apply a high frequency voltage to the piezoelectric element of the stator to cause the piezoelectric element to vibrate, and to circumferentially expand the vibration with the comb teeth body integrally provided with the piezoelectric element for circumferentially moving the comb teeth body in a traveling wave form, thus to cause the rotor, which is frictionally engaged with the piezoelectric element, to rotate around the shaft. Accordingly, a mechanism that presses the rotor into contact with the stator is required, and conventionally a spring means has been proposed as the pressure source for the ultrasonic motor.

Figure 7:
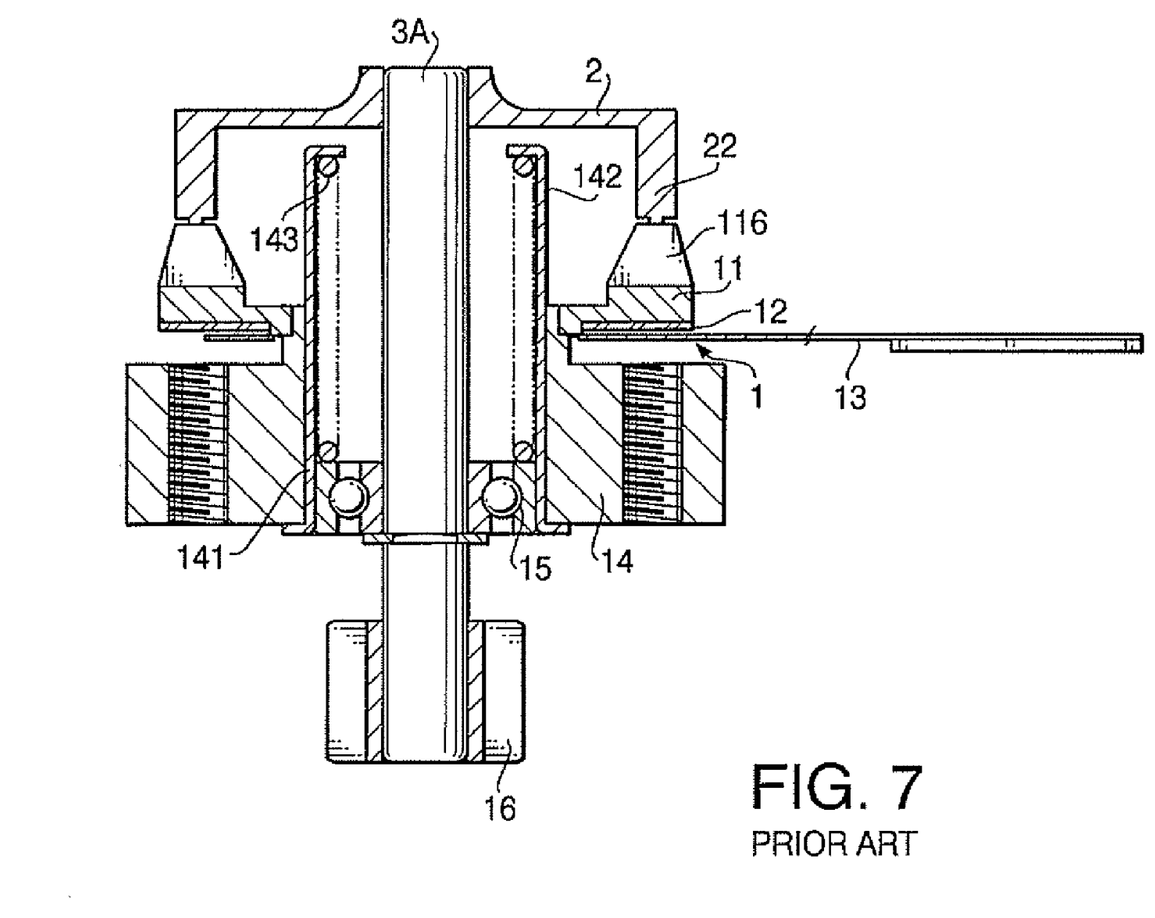
FIG. 7 is a cross-sectional view of a conventional ultrasonic motor.

FIG. 7 is a cross-sectional view showing an example of such a conventional ultrasonic motor, which includes a flat disk-shaped piezoelectric element 12 circumferentially polarized in a plurality of poles and integrally mounted on a disk-shaped base 14 with fixing holes for the motor, and a short cylindrical container-shaped comb teeth body 11 with a plurality of comb teeth 116 circumferentially aligned integrally provided on the piezoelectric element 12, and the piezoelectric element 12 and the comb teeth body 11 constitute a stator 1. To the piezoelectric element 12, a high frequency voltage is to be applied via a flexible substrate 13. At the center of the base 14 a shaft hole 141 is provided, in which a cylindrical sleeve 142 is fixed along the inner circumferential surface thereof. Inside the sleeve 142 a ball bearing 15 is enclosed, so as to pivotally support a rotating shaft 3A. To the rotating shaft 3A, a short cylindrical shaped rotor 2 is attached, such that an end face of a peripheral wall portion 22 extended from the peripheral edge of the rotor 2 is butted to each of the comb teeth 116 of the comb teeth body 11. Also, a compressed coil spring 143 is inserted in an axial direction between an upper end of the sleeve 142 according to the drawing and the ball bearing 15, so that the axial elastic force of the compressed coil spring 143 biases the ball bearing 15 and the supporting rotating shaft 3A downward according to FIG. 7, thus to press the lower end face of the peripheral wall portion 22 of the rotor 2 to the upper end face of the comb teeth 116 of the stator 1.

In this ultrasonic motor, when a high frequency voltage is applied to the piezoelectric element 12 via the flexible substrate 13, the piezoelectric element 12 vibrates, and hence the comb teeth body 11 integrally mounted therewith vibrates, to thereby circumferentially displace the comb teeth 116 which are circumferentially aligned. Accordingly, the peripheral wall portion 22 of the rotor 2 butted to the comb teeth 116 is equally moved circumferentially by the frictional force, so that the rotor 2 and the rotating shaft 3A integrally attached thereto are caused to rotate. The rotational force of the rotating shaft 3A is transmitted to outside via a gear 16 attached to the rotating shaft 3A.

Thus, the coil spring 143 is employed as the elastic source to press the rotor 2 against the stator 1 at a required pressure, however the coil spring 143 has to have a predetermined axial length in order to attain the necessary pressure, which inhibits making the axial dimension of the ultrasonic motor shorter than the length of the coil spring 143. Besides, to facilitate the transmission of the vibration of the comb teeth body 11 to the rotor 2, the contact surface of the comb teeth body hand the contact surface of the rotor 2 have to remain precisely parallel, in other words the rotating shaft 3A has to remain precisely perpendicular with respect to the contact surface of the rotor 2 and the contact surface of the comb teeth body 11. However, since those components are each independent, high processing precision is required. Accordingly, it is preferable that the rotating shaft 3A is granted with certain freedom to tilt with respect to the central axis, to alleviate the precision requirement. This requires that the axial dimension between the rotor 2 and the ball bearing 15 be made longer than the necessary length. Consequently, it is difficult to design a thin ultrasonic motor with a reduced axial dimension, from the ultrasonic motor of the structure as shown in FIG. 7. Besides, although the ball bearing 15 is employed to pivotally support the rotating shaft 3A, a small ball bearing suitable for an ultrasonic motor is generally expensive, and therefore employing the ball bearing impedes achieving an ultrasonic motor at a low cost.

Regarding the foregoing problem, Japanese Patent Provisional Publication No. P2000-60154A (hereinafter, referred to as '154 publication) proposes an ultrasonic motor in which a circular disk portion surrounded by a peripheral wall portion of a short cylindrical-shaped rotor is formed as a thin coned disk spring, so as to utilize the spring force provided by the disk portion to press the peripheral wall portion of the rotor against the comb teeth portion of the stator. The ultrasonic motor according to '154 publication eliminates the need to employ the coil spring, and is therefore advantageous in making the ultrasonic motor thinner.

In the ultrasonic motor according to '154 publication, the spring force is created by the disk portion of the rotor, however making the disk portion thicker thus to increase the spring force degrades the deformability of the peripheral wall portion, which leads to insufficient contact between the rotor and the comb teeth. On the contrary, making the disk portion thinner to secure proper contact between the rotor and the comb teeth results in reduced spring force. In this case, besides, a predetermined displacement amount of the peripheral wall portion has to be secured, for which the disk portion has to have a certain diameter. Accordingly, the radial dimension of the disk portion cannot be made smaller than a certain limit, and it is therefore difficult to make the ultrasonic motor radially smaller. On the other hand, since the disk portion is attached to a rotating shaft via a ball bearing, the ball bearing cannot be omitted, which makes it difficult to reduce the cost.

SUMMARY OF THE INVENTION

Aspects of the invention is advantageous in that there is provided an improved ultrasonic motor that can be made smaller and thinner.

According to an aspect of the invention, there is provided an ultrasonic motor, which is provided with a circular stator including a piezoelectric element and a comb teeth body and a circular rotor supported by a rotating shaft and disposed in close contact with the comb teeth body. The stator and the rotor are magnetized in opposite polarities to each other, so that the stator and the rotor are brought into close contact by an attractive magnetic force generated therebetween in an axial direction.

End faces of a plurality of comb teeth aligned along a periphery of the comb teeth body and circumferentially separated by slits, and an end face of a peripheral wall portion extending from a peripheral edge of the rotor to be brought into close contact with the comb teeth, may be formed in a conical surface with a tapered cross-section.

The rotating shaft may be pivotally supported at an end portion thereof by a bearing provided on the stator.

The rotating shaft may include a semispherical portion at an end portion thereof, slidably supported by the bearing having an inverted conical-shaped bearing surface, provided on the stator.

The rotor may be spline-connected to the rotating shaft. Further, the spline provided on the rotating shaft may serve as a rotation outputting gear to be engaged with an external apparatus.

DETAILED DESCRIPTION OF THE EMBODIMENTS

According to aspects of the invention, there is provided an ultrasonic motor which is provided with a circular stator including a piezoelectric element and a comb teeth body; and a circular rotor supported by a rotating shaft and disposed in close contact with the comb teeth body; wherein the stator and the rotor are magnetized in opposite polarities to each other, so that the stator and the rotor are brought into close contact by an attractive magnetic force generated therebetween in an axial direction.

According to the above configuration, the rotor and the comb teeth body of the stator are adsorbed in an axial direction by the magnetic force. Accordingly, when the piezoelectric element vibrates so that the integrally mounted comb teeth body vibrates, the rotor remains in close contact with the comb teeth body because of the attractive magnetic force, thus to maintain the frictional force generated between the comb teeth body and the rotor at a maximal level, and to improve the rotation efficiency of the rotor. In addition, since a coil spring as employed in a conventional ultrasonic motor is not required, the ultrasonic motor can be made smaller in an axial direction, thus to be made thinner. Also, there is no need to have a disk portion of the rotor create the spring force as the configuration disclosed in '154 publication, which allows designing the disk portion as desired, such that, especially, the rotor can be made sufficiently thick for securing a close contact with the comb teeth, thus facilitating the design of the ultrasonic motor.

The rotating shaft is pivotally supported at an end portion, by a bearing provided on the stator. The rotating shaft includes a semispherical portion at the end portion, to be slide-supported by bearing with an inverted conical bearing surface, provided on the stator. Such structure allows increasing the tilting freedom of the rotating shaft, and hence the rotor.

Also, the respective end faces of the plurality of comb teeth aligned along the peripheral portion of the comb teeth body and circumferentially separated by slits, and the end face of the peripheral wall portion extending from the peripheral edge of the rotor to be brought into close contact with the comb teeth, are formed in a conical surface with a tapered cross-section. Accordingly, when the comb teeth and the peripheral wall portion are butted a centripetal force is generated, so that the rotor can rotate without largely shifting radially, despite performing a precession.

The rotor is spline-connected to the rotating shaft. When the rotor performs the precession with the rotation, it is only the rotor that makes the precession movement, and the rotating shaft rotates around the constantly stable central axis to output the rotational force. Accordingly, the deformation of the disk portion does not have to be taken into consideration for securing a displacement amount required to maintain the proper contact with the comb teeth, and the radial dimension of the disk portion, and hence the rotor, can be made smaller, which enables making the ultrasonic motor smaller by reducing the radial dimension thereof. The spline provided on the rotating shaft is formed as a gear to be engaged with an external apparatus for outputting the rotational force, which leads to reduction in number of parts. Also, since the bearing is not a ball bearing, the cost of the ultrasonic motor can be reduced, Here, referring to the accompanying drawings, aspects of the invention will be described in detail.

Figure 1:
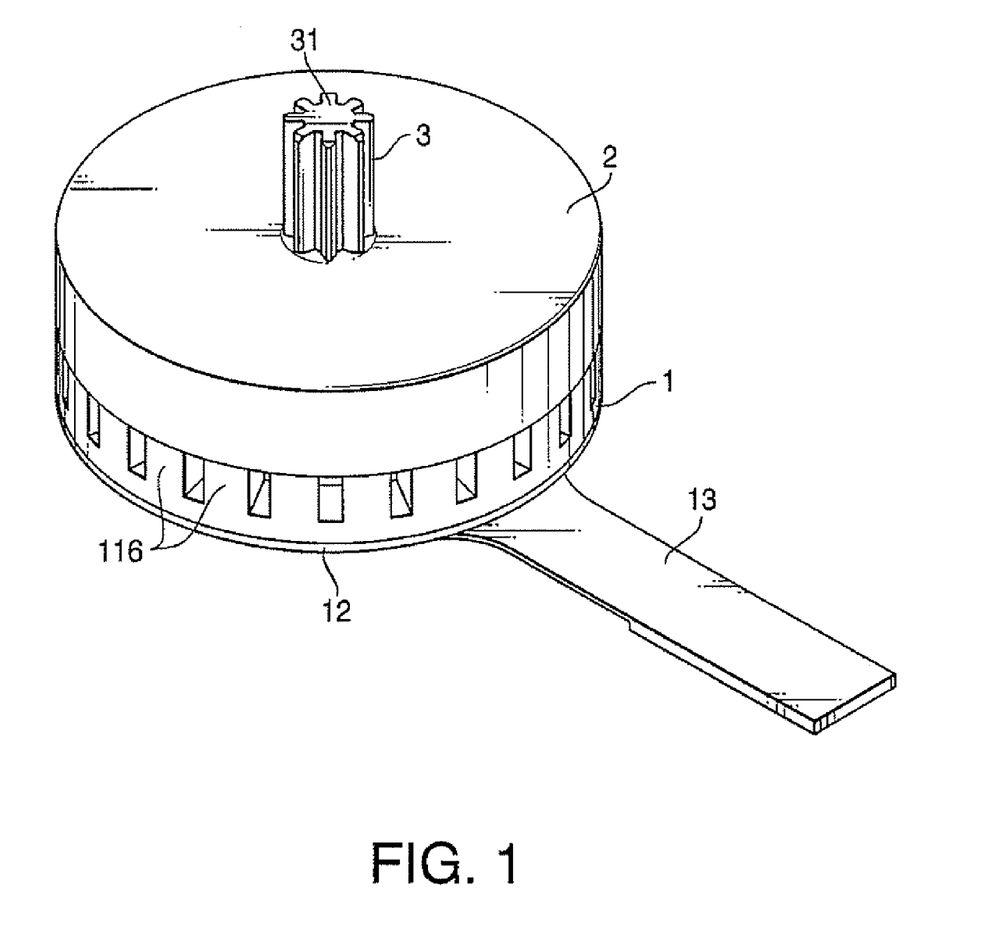
FIG. 1 is a perspective view showing an appearance from above of an ultrasonic motor according to an embodiment.
Figure 2:
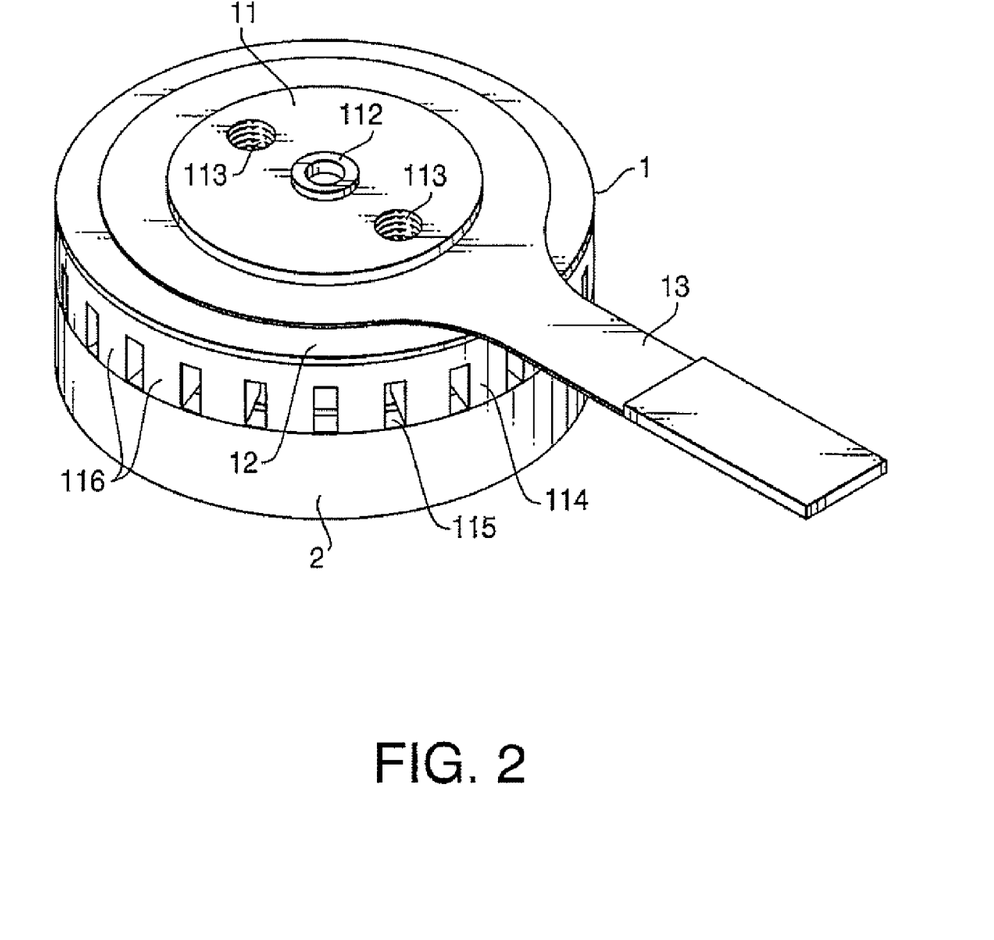
FIG. 2 is a perspective view showing an appearance from below of the ultrasonic motor according to the embodiment.
Figure 3:
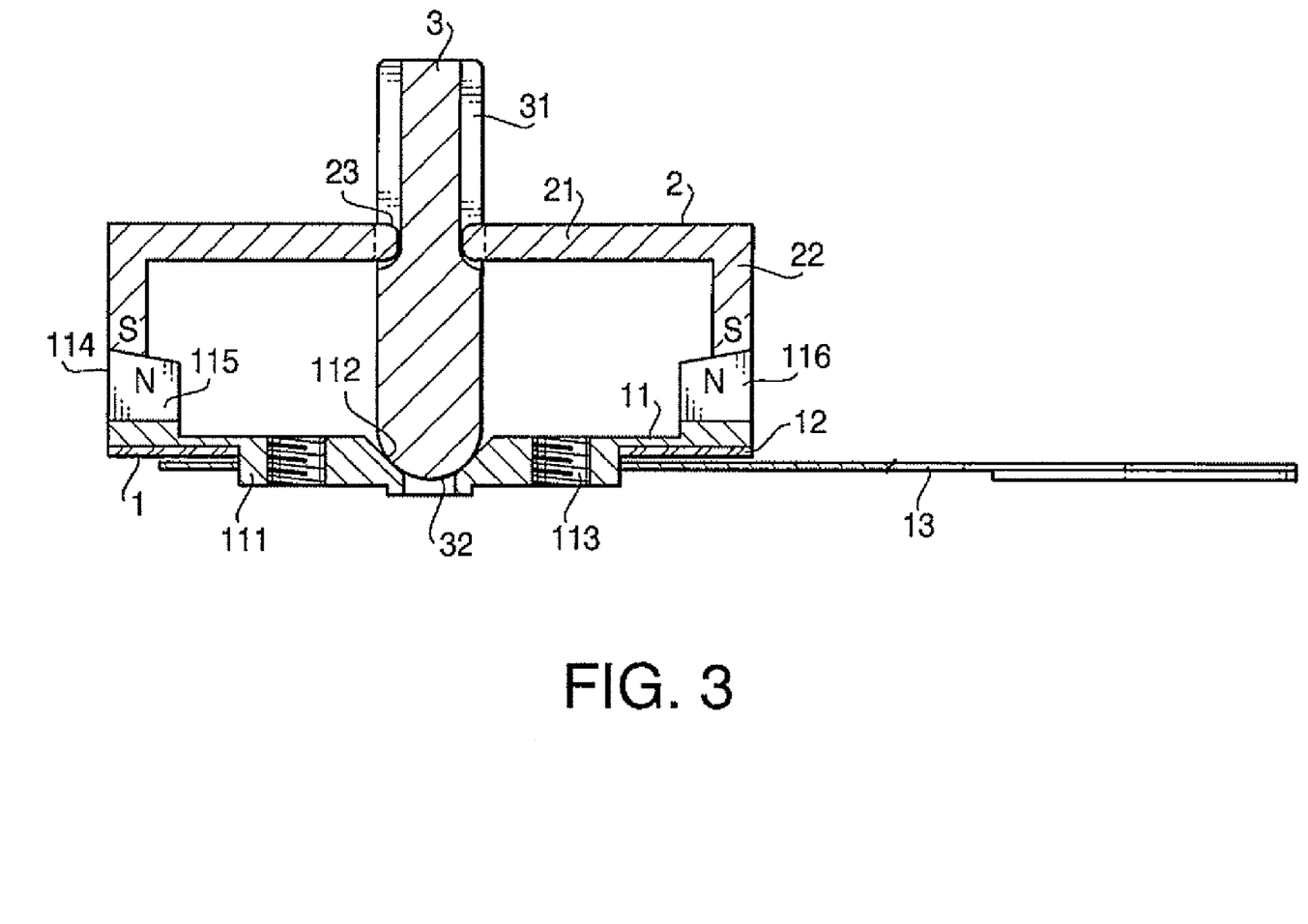
FIG. 3 is a cross-sectional view of the ultrasonic motor according to the embodiment, along the central axis.
Figure 4:
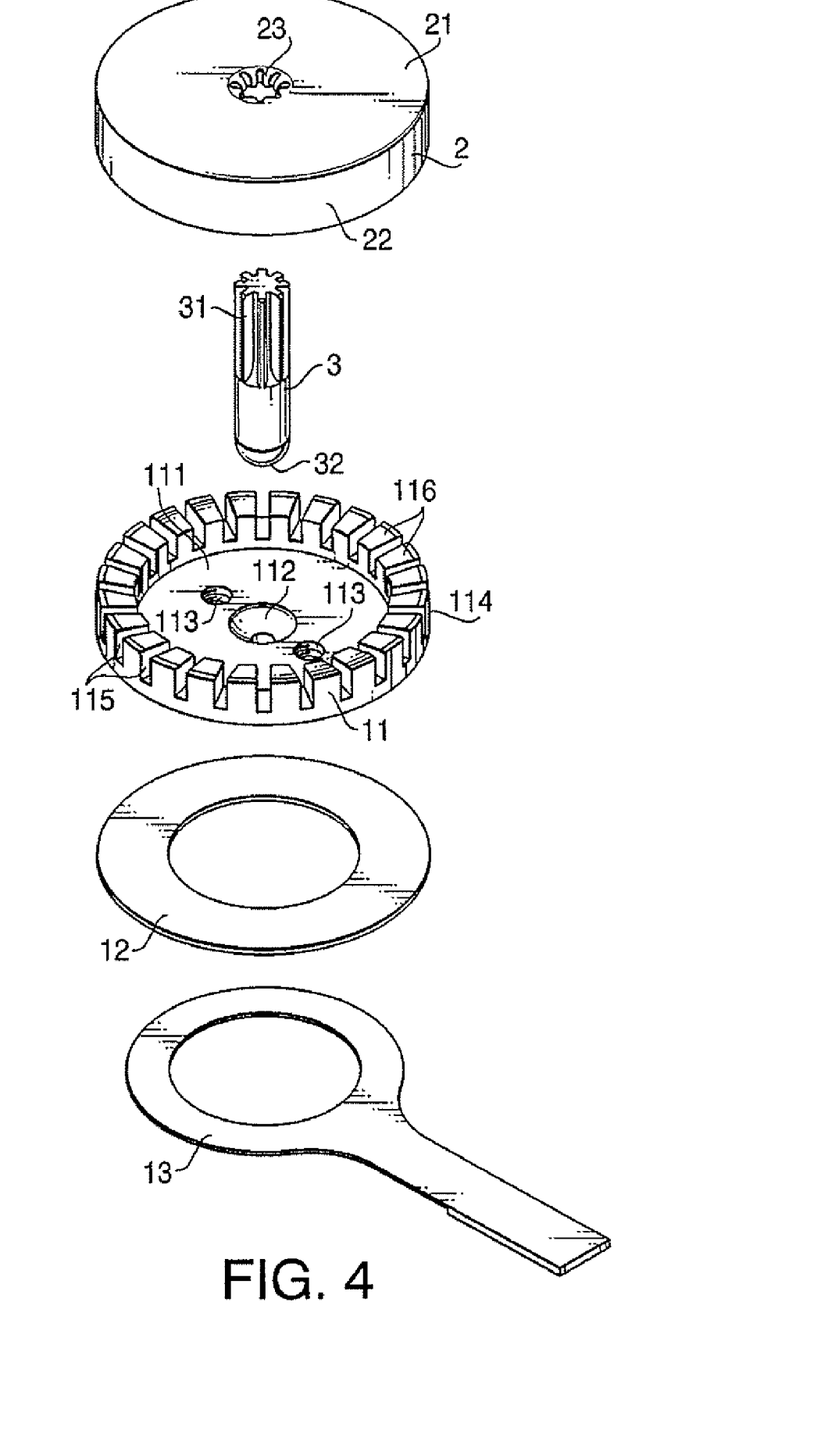
FIG. 4 is a fragmentary exploded perspective view showing the ultrasonic motor according to the embodiment.

FIG. 1 is a perspective view showing an appearance from above of an ultrasonic motor according to an embodiment, and FIG. 2 is a perspective view from the opposite side. FIG. 3 is a vertical cross-sectional view along the central axis, and FIG. 4 is a fragmentary exploded perspective view from FIG. 1. In these drawings, the ultrasonic motor includes a stator 1 and a rotor 2, and the stator 1 includes a comb teeth body 11 generally formed in a circular shape, a ring-shaped piezoelectric element 12 integrally attached to the lower face of the comb teeth body 11, and a flexible substrate 13 attached to the lower face of the piezoelectric element 12 and electrically connected thereto. The rotor 2 is of a short cylindrical shape oriented downward, and integrally supported in a rotating direction by a rotating shaft 3 rotatably supported by the stator 1.

The comb teeth body 11 of the stator 1 is formed of a ferromagnetic material such as iron, in a circular shallow dish shape, and magnetized in a predetermined polarity as will be subsequently described. At the central position of a circular bottom plate 111 of the comb teeth body 11, a shaft hole 112 is provided which has an inverted conical bearing surface having a reversely tapered cross-section. The bearing surface of the shaft hole 112 is finished to provide low friction and abrasion resistance, for example by non-electrolytic Ni—P plating. The bottom plate 111 includes two mounting holes 113 located so as to oppose each other across the shaft hole 112 along a direction of its diameter, to be utilized when attaching the ultrasonic motor to an apparatus not shown in the drawings. Along the peripheral edge of the bottom plate 111 a circumferential wall 114 is provided so as to project upward, which is divided into a multitude of circumferentially aligned comb teeth 116, by a plurality of radial slits 115 formed in a predetermined depth from the surface of the circumferential wall 114. The comb teeth 116 respectively has an upper end face configured as an inverted conical shape, inclined downward toward the inside and having a reversely tapered cross-section, and the upper end face of the comb teeth 116 is magnetized as either the S-pole or N-pole, specifically as the N-pole in this embodiment, by the magnetization of the comb teeth body 11.

The piezoelectric element 12 is provided with circumferentially formed polarization patterns, though not shown in the drawings, and the respective polarization patterns are unified with the lower surface of the comb teeth body 11 by bonding or the like. Also, though not shown in the drawings, the piezoelectric element 12 are provided with an electrode for applying a voltage to the respective polarization patterns, and the flexible substrate 13 is electrically connected to the electrode so as to apply a predetermined high frequency voltage to the piezoelectric element 12 via the flexible substrate 13.

The rotor 2 is constituted of a resin of a thermal deformation temperature of 200° C. such as PPS or nylon, in which an abrasion-resistant material such as a potassium titanate whisker and a magnetic fine powder such as Nd—Fe—B are mixed, and formed by injection molding, for example. The rotor 2 includes a circular-shaped disk portion 21 and a peripheral wall portion 22 projecting downward from the peripheral edge of the disk portion 21, and is disposed such that the lower end face of the peripheral wall portion 22 is brought into close contact with the upper end face of the comb teeth 116 of the comb teeth body 11. To achieve the close contact, the lower end face of the peripheral wall portion 22 is formed in an inverted conical shape with a tapered cross-section inclined downward toward the inside, so as to fit the upper end face of the comb teeth 116. The disk portion 21 includes a spline hole 23 of a gear shape formed at the center thereof, which is spline-connected to a gear section 31 provided on the rotating shaft 3, thus to be unified with the rotating shaft 3 in a rotating direction. The gear section 31 is formed over a region axially extending from the topmost portion of the rotating shaft 3 to the generally central portion thereof, and the spline hole 23 of the rotor 2 is fitted to the gear section 31 from the topmost portion of the rotating shaft 3, to achieve the spline connection. The lower end portion of the rotating shaft 3 is formed in a semispherical shape thus constituting a semispherical portion 32, which is butted to the bearing surface of the shaft hole 112 of the comb teeth body 11, so that these components constitute a slide bearing. The rotor 2 is magnetized in the opposite polarities to the comb teeth body 11, and the lower end face of the peripheral wall portion 22 is magnetized as the S-pole, which is opposite to the upper end face of the comb teeth 116.

In this ultrasonic motor, a high frequency voltage of an ultrasonic range of a frequency of 20 KHz or higher is applied to the piezoelectric element 12 through the flexible substrate 13, so as to cause the circumferentially polarized piezoelectric element 12 to vibrate in a thicknesswise direction. The vibration of the piezoelectric element 12 is transmitted to the comb teeth body 11 integrally attached thereto so as to cause the comb teeth body 11 to vibrate in a thicknesswise direction, and further the vibration of the comb teeth body 11 is converted into a circumferential vibration with an expanded displacement, by the comb teeth 116 divided by the slits 115 and circumferentially aligned. Accordingly, the peripheral wall portion 22 of the rotor 2 disposed in close contact with the upper end face of the comb teeth 116 is frictionally driven by the thicknesswise and circumferential displacement of the comb teeth 116 in a circumferential direction, so that the rotor 2 is resultantly caused to rotate with a precession. The rotation of the rotor 2 is transmitted to the rotating shaft 3 spline-connected thereto, thus to rotate the rotating shaft 3 around its central axis. The rotational force of the rotating shaft 3 rotationally drives an external apparatus via a gear (not shown) engaged with the gear portion 31.

In the rotational operation of the ultrasonic motor, the lower end face of the peripheral wall portion 22 of the rotor 2 is magnetized as the S-pole, while the upper end face of the comb teeth 116 of the stator 1 is magnetized as the N-pole, and hence these end faces are adsorbed to each other by the magnetic force in an axial direction. Accordingly, when the piezoelectric element 12 vibrates to cause the comb teeth body 11 integrally attached thereto to vibrate, and to thereby circumferentially displace the comb teeth 116, the peripheral wall portion 22 of the rotor 2 remains in close contact with the upper end face of the comb teeth 116 by the attractive magnetic force. Therefore the frictional force created between the comb teeth 116 and the peripheral wall portion 22 can be maintained sufficiently large, so as to improve the rotation efficiency of the rotor 2. Besides, since the coil spring 143 as employed in the ultrasonic motor shown in FIG. 7 is not necessary, the axial dimension of the ultrasonic motor can be reduced, thus to make the ultrasonic motor thinner. Also, the disk portion of the rotor is not required to generate the spring force unlike the ultrasonic motor according to the patented '154 publication, which permits designing the thickness of the disk portion 21 as desired.

Further, on the slide bearing, the semispherical portion 32 formed at the lower end portion of the rotating shaft 3 makes linear contact with the bearing surface of the shaft hole 112 formed in the inverted conical shape so as to slide thereon, and the rotor 2 is spline-connected to the rotating shaft 3 so as to axially move with respect thereto and to incline with respect to the axial line. Accordingly, even thought the rotor 2 performs the precession when rotating, it is only the rotor 2 that performs the precession, and the rotating shaft 3 rotates around the constantly stable central axis to output the rotational force. Accordingly, the deformation of the disk portion 21 does not have to be taken into consideration for securing the necessary displacement amount, and the radial dimension of the disk portion 21, and hence the radial dimension of the rotor, can be made smaller, which enables making the ultrasonic motor smaller by reducing the radial dimension thereof. Also, the lower end face of the peripheral wall portion 22 and the end faces of the comb teeth 116 are respectively formed in the inverted conical shape and brought into close contact with each other to thereby generate a centripetal force, thus causing the rotor 2 to rotate without any shift of the central axis. Further, since the bearing is not a ball bearing, the cost of the ultrasonic motor can be reduced.

According to the embodiment, the comb teeth body and the rotor are both constituted of a ferromagnetic material or components containing a ferromagnetic material and magnetized, however a magnet (permanent magnet) may be integrally attached to the rotor, so as to obtain the same working effect as magnetizing. The magnet may be provided on the comb teeth body, however it should be taken care not to disturb the displacement motion of the comb teeth.

Figure 5:
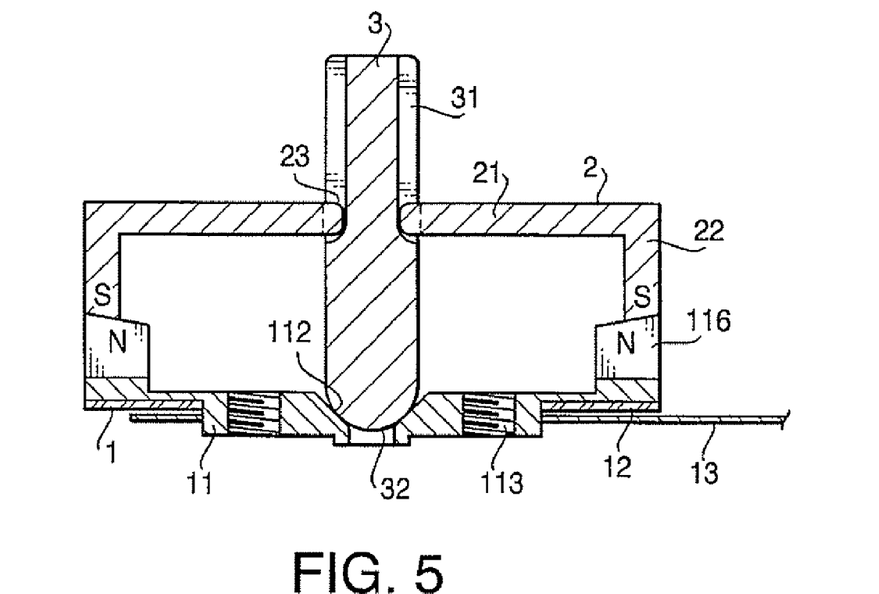
FIG. 5 is a cross-sectional view of a variation of the ultrasonic motor.

Although in the embodiment the end faces of the rotor and the comb teeth body to be brought into close contact are formed in an inverted conical shape, the lower end face of the peripheral wall portion 22 of the rotor 2 may be formed in a conical shape so as to cover the comb teeth body 116, as the cross-section shown in FIG. 5.

Figure 6:
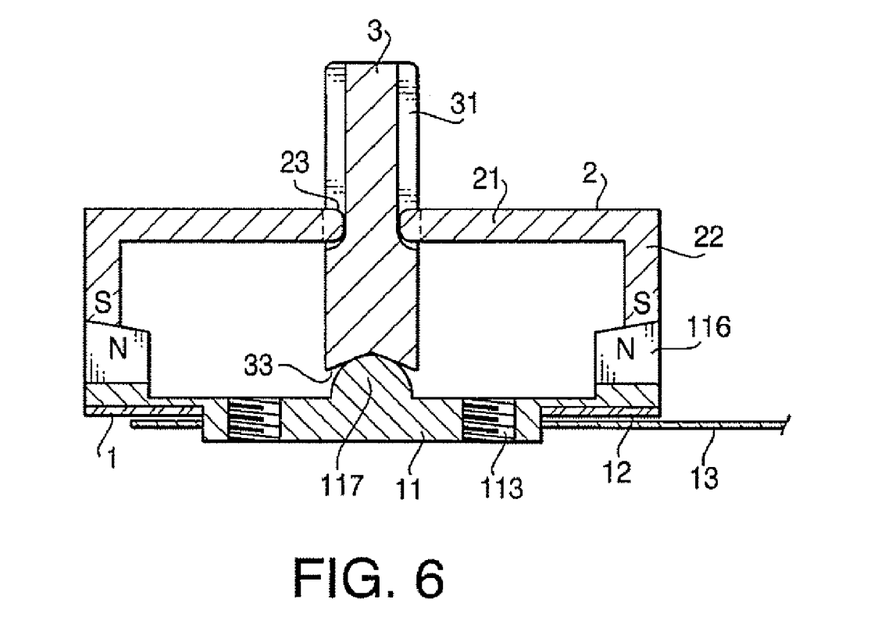
FIG. 6 is a cross-sectional view of another variation of the ultrasonic motor.

Although the rotating shaft includes the semispherical portion, which is made to contact the inverted conical-shaped bearing surface thus to constitute the slide bearing in the embodiment, a different structure may be employed as long as the slide bearing is capable of automatically performing the center alignment of the rotating shaft 3. For example as shown in FIG. 6, a concave conical surface 33 may be provided on the lower end portion of the rotating shaft 3, to be engaged with a semispherical portion 117 formed so as to semispherically protrude from the bottom plate 111 of the stator 1.

Further, obviously the gear section of the rotating shaft for outputting the rotational force may be provided as a separate component, as long as such increase in number of parts is permissible. In this case, the structure of the spline is not limited to a gear configuration, but a desired spline may be adopted.

The present disclosure relates to the subject matter contained in Japanese Patent Application No. 2005-261476, filed on Sep. 9, 2005, which is expressly incorporated herein by reference in its entirety.

What is claimed is:

1. An ultrasonic motor, comprising
 a circular stator including a piezoelectric element and a comb teeth body; and
 a circular rotor supported by a rotating shaft and disposed in close contact with the comb teeth body,
 wherein a surface of the comb teeth body and a surface of the rotor configured to contact the comb teeth body are magnetized in opposite polarities to each other, whereby the stator and the rotor are brought into close contact by an attractive magnetic force generated between the comb teeth body and the surface of the rotor in an axial direction.

2. The ultrasonic motor according to claim 1,
 wherein end faces of a plurality of comb teeth aligned along a periphery of the comb teeth body and circumferentially separated by slits, and a face of a peripheral wall portion extending from a peripheral edge of the rotor to be brought into close contact with the comb teeth, are configured as a conical surface with a tapered cross-section.

3. The ultrasonic according to claim 1, wherein the rotating shaft is pivotally supported at an end portion of the shaft by a bearing provided on the stator.

4. The ultrasonic motor according to claim 3, wherein the rotating shaft includes a semispherical portion at an end portion of the rotating shaft, slidably supported by the bearing having an inverted conical-shaped bearing surface, provided on the stator.

5. The ultrasonic motor according to any of claim 1, wherein the rotor is spline-connected to the rotating shaft.

6. The ultrasonic motor according to claim 5, wherein the spline provided on the rotating shaft comprises a rotation outputting gear configured to be engaged with an external apparatus.

7. An ultrasonic motor, comprising:
 a circular stator including a piezoelectric element and a comb teeth body; and
 a circular rotor supported by a rotating shaft and positioned in close contact with the comb teeth body, the rotating shaft being pivotally supported at an end portion of the shaft by a bearing provided on the stator;
 wherein the stator and the rotor or are magnetized to have polarities opposite from each other, whereby the stator and the rotor are brought into close contact by an attractive magnetic force generated between the stator and the rotor in an axial direction.

8. The ultrasonic motor according to claim 7, wherein end faces of a plurality of comb teeth aligned along a periphery of the comb teeth body and circumferentially separated by slits, and an end face of a peripheral wall portion extending from a peripheral edge of the rotor to be brought into close contact, with the comb teeth are configured as conical surfaces with tapered cross-sections.

9. The ultrasonic motor according to claim 8, wherein the rotating shaft includes a semi-spherical portion at an end portion of the shaft, slideably supported by the bearing having an inverted conical shaped bearing surface, provided on the stator.

10. The ultrasonic motor according to claim 7, wherein the rotor is spline-connected to the rotating shaft.

11. The ultrasonic motor according to claim 10, wherein the spline provided on the rotating shaft comprises a rotation outputting gear configured to be engaged with an external apparatus.

* * * * *